United States Patent Office 3,641,018
Patented Feb. 8, 1972

3,641,018
PROCESS FOR PREPARING 7-AMINO
CEPHALOSPORANIC ACID
Harold B. Hayes and Gerald L. Huff, Indianapolis, Ind.,
assignors to Eli Lilly and Company, Indianapolis, Ind.
No Drawing. Filed June 26, 1969, Ser. No. 836,953
Int. Cl. C07d 99/24
U.S. Cl. 260—243
10 Claims

ABSTRACT OF THE DISCLOSURE

The preparation of 7-aminocephalosporanic acid (7–ACA) from cephalosporin C by treatment with a halogenating agent to obtain the imino chloride, conversion of the imino chloride to an imino ether, and hydrolysis of the imino ether is improved if the amino group in the adipamyl side chain is protected by a halo lower alkanoyl group. A further improvement is realized by using an amine salt of the N-haloalkanoylcephalosporin C.

BACKGROUND OF THE INVENTION

The cephalosporins are a well-known family of antibiotics and are widely used in the treatment of disease. The only member of this family that has been obtained by fermentation is cephalosporin C. Cephalosporin C has a low order of activity and it is necessary to chemically convert it to other more active cephalosporins. One step in such modification is the removal of the adipamyl side chain of cephalosporin C to yield 7–ACA.

It has long been known to treat an amide with a halogenating agent to convert the amide to an imino halide and to treat the imino halide with an alcohol to obtain the imino ether. The imino ether then readily undergoes hydrolysis to an amine and an ester. This reaction sequence is disclosed, for example, by Lander, J. Chem. Soc. 83, 320(1903).

In Morin et al., U.S. Pat. 3,188,311 there is disclosed a method for converting cephalosporin C to 7–ACA by way of a cyclic internal imino ether which is hydrolyzed to 7–ACA. The cyclic imino ether intermediate in that process was not obtained by way of an imino halide. However, the total reaction sequence disclosed by Lander has been applied to cephalosporin C and the preparation of 7–ACA by this method is disclosed in Canadian Pat. 770,125 and British Pat. 1,041,985.

SUMMARY

We have now discovered an improvement in the process of preparing 7–ACA from cephalosporin C by protecting the carboxyl groups, treating with a halogenating agent to convert the amido group in the 7-position to an imino halide, converting the imino halide to an imino ether and hydrolyzing the imino ether to 7–ACA. Our improvement comprises protecting the adipamyl amino group with an $\alpha$-halo or $\alpha,\alpha$-dihalo $C_2$–$C_4$ alkanoyl group. A further improvement results from treating the thus protected cephalosporin C with an amine to form the amine salt prior to the step of protecting the carboxyl groups.

Our improvemen makes it unnecessary to isolate cephalosporin C from the fermentation broth but allows treatment of the cephalosporin C directly in the fermentation broth. This eliminates the losses of cephalosporin C that are normally encountered in the isolation from the broth. Further, if an amine salt is used a more homogeneous reaction mixture results, thereby requiring shorter reaction times in preparing an ester to protect the carboxyl group. High yields of 7–ACA of high purity are obtained by means of our improvement.

DESCRIPTION OF THE PREFERRED EMBODIMENT

Heretofore, the process of converting cephalosporin C to 7–ACA by way of the imino halide and imino ether has involved the steps of protecting the side chain amino group and the carboxyl groups, treating the protected cephalosporin C with a halogenating agent such as phosphorous pentachloride or phosphorous oxychloride to prepare the imino halide, reacting the imino halide with an alcohol to obtain an imino ether and hydrolyzing the imino ether to 7–ACA. In our improved process the steps of protecting the carboxyl groups, preparing the imino halide, converting the halide to the imino ether and hydrolyzing the imino ether remain unchanged. Our improvement lies in the choice of the particular protecting group for the side chain amine.

To protect the amino group in the adipamyl side chain of cephalosporin C we acylate the amino group with an $\alpha$-halo or $\alpha,\alpha$-dihalo $C_2$–$C_4$ alkanoyl group. Thus, the protecting group is one derived from a $C_2$–$C_4$ carboxylic acid having one or two halogen atoms on the $\alpha$-carbon atom. The preferred halogen atom is chlorine but other halogens such as bromine and fluorine can also be used. Examples of suitable protecting groups include chloroacetyl, dichloroacetyl, bromoacetyl, fluoroacetyl, $\alpha$-chloropropionyl, $\alpha,\alpha$-dichloropropionyl, $\alpha$-chlorobutyryl and $\alpha$-chloro-$\alpha$-methylpropionyl. The chloroacetyl group is preferred.

Usual actylation techniques known to those skilled in the art are used in placing the protecting group on the amino group. The acylation may be conducted using a haloacyl halide or a mixed anhydride. We have had particularly good results using an acyl chloride such as chloroacetyl chloride.

The cephalosporin C may be isolated from the fermentation broth prior to this acylation step but such isolation nullifies a part of the advantage gained from our improvement. Maximum benefit of the improvement is to be gained if cephalosporin C is acylated directly in the fermentation broth. The broth is preferably filtered prior to the acylation step and may also be concentrated to avoid handling large volumes of water. Thus, it is an advantage of our process that the cephalosporin C may be acylated in the fermentation broth or as isolated crystalline cephalosporin C or at any point in between. It is desirable to acylate the cephalosporin C at an early stage in order to avoid costly isolation procedures and losses that occur upon isolation.

The N-acylated cephalosporin C is next extracted from the acylation mixture with an organic solvent. We have found the lower esters such as ethyl acetate, n-propyl acetate, isopropyl acetate, and sec.-butyl acetate to be excellent solvents for this extraction. It is sometimes advantageous to mix the ester with from one-tenth to one volume of a lower alkanol such as ethyl alcohol or n-butyl alcohol. The extraction is preferably conducted at an acid pH.

The extract containing the acylated cephalosporin C is then made basic to prepare a salt of the N-haloalkanoylcephalosporin C. This salt precipitates from the organic solvent upon stirring, preferably with cooling of the solution. While it has not been conclusively established it appears that only one carboxyl group of the N-acylated cephalosporin C is converted to a salt regardless of the amount of base that is employed.

While any base, such as sodium hydroxide, sodium acetate, potassium carbonate, or calcium hydroxide, may be used to form the salt, we prefer to use an amine that will form a solid salt with the acylated cephalosporin C. This may be a primary, secondary, or a tertiary amine but tertiary amines are preferred. Amines that we have found to be suitable include quinoline, cyclohexylamine, 5-ethyl-2-methylpyridine, 2-picoline, 3-picoline, 4-picoline, N-ethylmorpholine, N-methylmorpholine, 2,6-lutidine, N,N-diethylcyclohexylamine, hexamethylenetetramine, N,N-dimethylbenzylamine, and N,N'-dibenzylethylenediamine. Quinoline is the preferred amine for use in our process.

The salt of the N-haloalkanoylcephalosporin C is now treated in the manner described in the prior art to remove the adipamyl side chain to yield 7–ACA. We have not only succeeded in avoiding the large losses of cephalosporin C that occur in its isolation from the fermentation broth, but when an amine salt is used have also obtained a more homogeneous reaction mixture in the ester preparation that follows, thereby resulting in a shorter reaction time.

The next step in the process is the blocking of the carboxyl groups of the acylated cephalosporin C to prevent their reaction with reagents employed in succeeding steps. Methods of protecting carboxyl groups are well known to those skilled in the art and the particular protecting group employed has no effect upon our improvement. A widely-used method of protecting carboxyl groups is the esterification of the group, preferably to form an ester that may be easily cleaved to regenerate the free acid after the side chain cleavage has been accomplished. Easily cleavable groups include the t-butyl, benzyl, benzhydryl, trityl, p-methoxybenzyl, trichloroethyl, phenacyl, and silyl esters such as trimethylsilyl, dimethylsilyl, methylsilyl, triethylsilyl, diethylsilyl and ethylsilyl. The silyl esters are particularly preferred.

Methods of preparing esters of carboxylic acids are well known to those skilled in organic chemistry. The method employed is not of particular importance to our improved process. We have had good success preparing silyl esters by treatment of our salt of N-haloalkanoylcephalosporin C with a chlorosilane such as trimethylchlorosilane, dimethyldichlorosilane, or ethyltrichlorosilane in the presence of an amine as hydrogen chloride acceptor in an inert solvent such as chloroform or methylene chloride.

This cephalosporin C having the carboxyl and amino groups blocked is now treated with a halogenating agent to convert the 7-amido group to an imino halide. This reaction is conducted in accordance with prior art procedures. Suitable halogenating agents are the acid halides, particularly the chlorides derived from phosphorous, sulfur, carbon, or their oxygen acids. Examples of suitable acid halides are phosphorous pentachloride, phosphorous oxychloride, phosphorous trichloride, phosgene, thionyl chloride, and oxalyl chloride. Phosphorous pentachloride is preferred. The reaction to prepare the imino halide is preferably carried out in the presence of a tertiary amine such as quinoline, pyridine or triethylamine.

In general, low temperatures are preferred for the halogenation reaction. Both time and temperature are dependent upon the halogenating agent employed. Ordinarily, temperatures below about 30° C. are used. For example, phosphorous pentachloride reacts very rapidly so that a temperature below about 0° C. is preferred when phosphorous pentachloride is used. Phosphorous oxychloride reacts more slowly so that a somewhat higher temperature of about 20° C. is preferred.

The imino chloride is then converted to an imino ether by reaction with an alcohol or phenol. This reaction, too, is preferably conducted at temperatures below about 30° C. in the presence of a tertiary amine to bind the hydrogen halide that is released. The preferred alcohols are the lower alkanols containing up to about four carbon atoms, especially methanol, ethanol, and n-propanol, or benzyl alcohol. Phenols may also be used but are not as satisfactory as the lower alkanols. We have also successfully used sulfhydryl compounds, although again, results are not as satisfactory as when lower alkanols are used.

The imino bond of the imino ether is readily split by mild acidic or basic hydrolysis or alcoholysis. If insufficient amine acid binder were used in the preceding step, the hydrolysis occurs merely upon addition of water. Sufficient hydrogen ions are present to bring about the hydrolysis and no additional acid is needed. The hydrolysis can also be conducted under mildly alkaline conditions as in the presence of an alkali metal salt of a weak acid. The process of hydrolysis or alcoholysis of imino ethers is well known to those skilled in organic chemistry. Certain carboxyl protecting groups such as the silyl esters are readily removed by the alcohol during formation of the imino ether so that the product obtained from this hydrolysis step is 7–ACA. However, when the carboxyl groups are protected by an acid stable group it is necessary to remove such group to obtain 7–ACA. For example, if the trichloroethyl ester had been prepared to protect the carboxyl group, the cleavage of the ester to regenerate the acid could be accomplished by hydrogenolysis.

The following examples will illustrate our improvement in the cleavage process. Two methods of analysis are used in this work. The first is an ultraviolet method which detects not only cephalosporin C but other related materials which will react with the acylating reagent. The second method is a nicotinamide method which is more specific for the cephalosporin C and the results of this method are used in calculating yields.

EXAMPLE 1

One liter of cephalosporin C fermentation broth which had been filtered and treated with ion exchange resin was found by ultraviolet analysis to contain 89 g. of cephalosporin C-like material and by nicotinamide analysis was found to contain 75.25 g. of cephalosporin C. To this liter of fermentation broth were added 1 l. of saturated sodium bicarbonate solution containing 25 ml. of 25 percent sodium hydroxide solution and 500 ml. of acetone. Over a 15-minute period there was added 500 ml. of a solution of 72 ml. of chloroacetyl chloride in acetone. During this addition period the pH was maintained between 8.0 and 8.7 and the reaction was kept in an ice bath to hold the temperature within the range of 20° to 28° C. The reaction mixture was stirred an additional 15 minutes after addition was completed. The total volume of the reaction mixture was 3070 ml.

To 1520 ml. of this original reaction mixture was added 300 ml. of benzene and the pH of the mixture was adjusted to 3.5 by the addition of 135 ml. of 6 N hydrochloric acid. The phases were allowed to separate and the benzene was discarded leaving 1220 ml. of aqueous solution. This 1220 ml. was divided into two equal portions which shall be referred to as solution A1 and A2.

To solution A1 was added an equal volume of ethyl acetate and the pH was adjusted to 2.0 by the addition of 6 N hydrochloric acid. The phases were separated and a second equal volume extraction with ethyl acetate was performed. The combined ethyl acetate extracts were dried over sodium sulfate leaving 1200 ml. of ethyl acetate solution which by ultraviolet analysis contained 11.5 g. of activity. To the ethyl acetate solution was added 16.6 ml. of quinoline and the mixture was seeded. The mixture was stirred overnight at room temperature and was then chilled before filtration. The solid product was washed with 25 ml. of acetone and dried in a vacuum oven to yield 18.9 g. of the quinoline salt of N-chloroacetylcephalosporin C.

To solution A2 were added 200 ml. of acetone and 810 ml. of ethyl acetate. The pH was adjusted to 2.0 with 6 N hydrochloric acid and the phases were allowed to separate. The ethyl acetate was dried over sodium sulfate to yield 1080 ml. of ethyl acetate extract which was shown by ultraviolet analysis to contain 12.9 g. of activity. To this solution was added 18.6 ml. of quinoline and the mixture was seeded. The mixture was stirred overnight and chilled before filtering off the solids. The solid product was washed with acetone and dried in a vacuum oven to yield 17.8 g. of the quinoline salt of N-chloroacetylcephalosporin C.

Another 1520 ml. of the original reaction mixture was treated with an equal volume of ethyl acetate and the pH was adjusted to 2.0 by the addition of 235 ml. of 6 N hydrochloric acid and the phases were separated. A second extraction with an equal volume of ethyl acetate was performed. The combined ethyl acetate extracts had a volume of 3000 ml. and ultraviolet analysis showed it to contain 30.9 g. of activity. The ethyl acetate solution was divided into three equal portions of 1000 ml. each identified as solutions B1, B2, and B3.

Solution B1 was dried over sodium sulfate, 15 ml. of quinoline was added, and the mixture was seeded. The mixture was stirred overnight at room temperature and chilled before filtering the solid product which was washed with acetone and dried to yield 12.6 g. of the quinoline salt of N-chloroacetylcephalosporin C. This product was identified as B1.

Solution B2 was also dried over sodium sulfate and concentrated to a volume of 109 ml. To the concentrate was added 15 ml. of quinoline and the mixture was seeded and stirred overnight at room temperature. The mixture was chilled and filtered, and the solid was washed with acetone to give 17.9 g. of the desired quinoline salt designated product B2.

Solution B3 was treated with 15 ml. of quinoline and seeded without drying. After stirring overnight at room temperature and chilling, solid product B3 was separated by filtration, washed with acetone and dried to yield 14.4 g.

EXAMPLE 2

To 1 l. of resin-treated cephalosporin C fermentation broth containing 32.5 g. of activity by ultraviolet analysis and 26.15 g. by nicotinamide analysis were added 300 ml. of acetone and 100 g. of dry sodium bicarbonate while the mixture was held in a 10° C. ice bath. The pH was adjusted to 8.5 by the addition of 25 percent sodium hydroxide solution. While cooling was continued a solution of 45 ml. of dichloroacetyl chloride in 255 ml. of acetone was added to the reaction mixture over a 15-minute period. During the addition the pH was maintained at 8.0 to 8.8 by addition of 25 percent sodium hydroxide solution. Upon completion of the addition the mixture was removed from the ice bath and stirred at 20° C. for 20 minutes. The pH was then adjusted to 3.5 with 6 N hydrochloric acid and 1700 ml. of ethyl acetate was added for extraction while the pH was further adjusted with 6 N hydrochloric acid to 1.9. This mixture was stirred for 15 minutes and centrifuged for separation. The ethyl acetate phase had a volume of 1940 ml. and ultraviolet analysis showed 12.8 g. of activity. To the ethyl acetate extract was added 41 ml. of quinoline in two approximately equal portions and the mixture was seeded. After standing in the refrigerator over the weekend the mixture was filtered, the solids washed with acetone and dried at 35° C. in a vacuum oven to yield 20.6 g. of the quinoline salt of N-dichloroacetylcephalosporin C.

EXAMPLE 3

The procedure of Example 2 was repeated replacing the dichloroacetyl chloride with 2-chloropropionyl chloride. The temperature rose to 40° C. during the addition and the pH was difficult to control, varying between 7.5 and 9.3. The product from the reaction was the quinoline salt of N-(2-chloropropionyl)-cephalosporin C.

EXAMPLE 4

Following the procedure of Example 2 using 4400 ml. of fermentation broth containing 145 g. of activity by ultraviolet analysis and 133 ml. of chloroacetyl chloride there was obtained 11,800 ml. of ethyl acetate extract containing 123.4 g. of N-chloroacetylcephalosporin C. This was divided into 1 l. aliquots each of which contained 17 mmoles of acylated cephalosporin C and each of which was treated with a different amine to obtain various amine salts of N-chloroacetylcephalosporin C. The procedure used in preparing the amine salt was to add 68 mmoles of the amine, seed and stir the mixture overnight, chill and filter. The product was washed with acetone and dried in a vacuum oven. In some cases an oil was obtained and it was necessary to triturate with acetone to obtain a solid product. In this manner the following salts were obtained:

(A) Quinoline salt of N-chloroacetylcephalosporin C
(B) 2-picoline salt of N-chloroacetylcephalosporin C
(C) 3-picoline salt of N-chloroacetylcephalosporin C
(D) 4-picoline salt of N-chloroacetylcephalosporin C
(E) N-ethylmorpholine salt of N-chloroacetylcephalosporin C
(F) N-methylmorpholine salt of N-chloroacetylcephalosporin C
(G) 2,6-lutidine salt of N-chloroacetylcephalosporin C
(H) Diethylcyclohexylamine salt of N-chloroacetylcephalosporin C
(I) N,N-dimethylbenzylamine salt of N-chloroacetylcephalosporin C

EXAMPLE 5

Four liters of filtered fermentation broth having a pH of 4.4 and containing 5.77 mg. of cephalosporin C per ml. by nicotinamide analysis was chilled in an ice bath. To this cold broth were added 20 g. of sodium borate decahydrate and 1200 ml. of acetone. The pH of this mixture was adjusted to 8.5 by the addition of 25 percent sodium hydroxide solution. To the chilled mixture was slowly added a solution of 74 ml. of chloroacetyl chloride in 600 ml. of acetone while the pH was maintained at 8.5. After addition was complete the mixture was stirred another 30 minutes maintaining the pH at 8.5. The pH was lowered to 4.5 by the addition of 25 percent sulfuric acid, 6800 ml. of ethyl acetate was added, and the pH was lowered to 2.0 by the addition of more sulfuric acid. After stirring for 15 minutes an emulsion had formed and the phases would not separate. To the emulsion were added 200 ml. of acetone and 150 ml. of a commercial demulsifier. The phases were separated and a second ethyl acetate extraction of the aqueous phase was made using 1 l. of ethyl acetate. The combined ethyl acetate phases had a total volume of 9.6 l. This was concentrated to 4.5 l. and divided into two beakers. To each beaker was added 70 ml. of quinoline and the mixture was stirred overnight. Crystals formed in one beaker while an oil had separated in the other. The supernatant liquid was decanted from the oil and seeded. The solution was then concentrated until solids started to form. The mixture was combined with the half that had previously had crystal formation. The mixture was stirred and chilled for one hour, then filtered. The solid quinoline salt of N-chloroacetylcephalosporin C was washed with a small amount of acetone and dried in a 40° C. vacuum oven to yield 15.3 g.

EXAMPLE 6

Ten liters of filtered fermentation broth was adjusted to pH 6.2 and concentrated in a flash evaporator to 1.8 l. Ultraviolet analysis showed this concentrated broth to contain 46.5 g. of cephalosporin C activity per liter. The concentrated filtered broth was chilled in an ice bath and 18 g. of sodium borate decahydrate and 540 ml. of acetone were added. The pH was adjusted to 8.5 with 25 percent sodium hydroxide solution. A solution of 56.5 ml. of chloroacetyl chloride in 4085 ml. of acetone was slowly added while the pH was maintained at 8.5 to 9.0 by the addition of 25 percent sodium hydroxide solution. The mixture was stirred 15 minutes after the addition was complete. To the mixture was added 1530 ml. of ethyl acetate, the pH was adjusted to 2.0 with 25 percent sulfuric acid. The mixture was stirred 15 minutes and the phases were separated by centrifugation. A second extraction with 1500 ml. of ethyl acetate was made, and the two ethyl acetate extracts were combined for a total volume of 3825 ml. The combined extracts were concentrated to 750 ml. and 1 l. of ethyl acetate saturated with water was added. Quinoline (100 ml.) was added, the mixture cooled in the refrigerator, filtered and the solid washed with 200 ml. of acetone and dried at 40° C. in a vacuum oven overnight to yield 51.8 g. of the quinoline salt of N-chloroacetylcephalosporin C.

EXAMPLE 7

The pH of a solution of 4.6 g. of the sodium salt of cephalosporin C having an 89 percent purity in 30 ml. of water was adjusted to 9.0 by the addition of 20 percent sodium hydroxide solution. A solution of 1.3 ml. of chloroacetyl chloride in 8.7 ml. of acetone was added dropwise while the pH was maintained at 8.0 to 9.3 by the addition of 10 percent sodium hydroxide. The addition required approximately 15 minutes and the mixture was stirred an additional five minutes. The pH was then adjusted to 6.5 with 6 N hydrochloric acid, 80 ml. of ethyl acetate was added, and the pH was lowered to 2.0 with 6 N hydrochloric acid. After stirring for five minutes the phases were separated and the ethyl acetate phase dried over sodium sulfate. A saturated methanolic solution of sodium acetate was added to a pH of 7.2 which rose to 7.7 on stirring. The white solid which separated was filtered, cooled, and dried in a desiccator overnight to yield 2.5 g. of the sodium salt of N-chloroacetylcephalosporin C.

Once our improved starting material has been prepared it can be treated in the manner described in the prior art to prepare a carboxyl protected derivative which is converted to an imino halide by treatment with a halogenating agent followed by conversion of the halide to an imino ether by treatment with an alcohol and hydrolysis of the imino ether to 7-ACA. These steps will be illustrated by the following examples.

EXAMPLE 8

To a stirred slurry of 7.19 g. of the product A1 from Example 1 in 72 ml. of alcohol-free chloroform were added 8 ml. of quinoline and 5.4 ml. of dichlorodimethylsilane. A clear solution formed in about 30 seconds but stirring was continued for 40 minutes. The reaction mixture was then chilled to −22° C. and 4.5 g. of phosphorous pentachloride was added. After stirring for two hours at −22° C. the mixture was chilled to −32° C. and 25 ml. of n-propanol was added, resulting in a temperature rise. The mixture was chilled to −22° C. and stirred for two hours. The mixture was extracted twice, first with 40 ml. of distilled water and the second time with 25 ml. of distilled water. To the combined water extract was added an equal volume of chloroform and the phases were then separated. The pH of the aqueous phase was adjusted from 0.8 to 3.5 by the addition of a saturated solution of ammonium bicarbonate. The 7-ACA which precipitated was removed by filtration and washed with 25 ml. of cold 50 percent methanol followed by 25 ml. of cold acetone and dried overnight in a vacuum oven at 35° C. The yield was 2.4 g. having a purity of approximately 93 percent by ultraviolet analysis.

EXAMPLE 9

The procedure of Example 8 was repeated using 7.19 g. of product A2 from Example 1. There was obtained 2.2 g. of 7-ACA.

In like manner there was obtained 2.5 g. of 7-ACA from 7.19 g. of product B1 from Example 1, 2.01 g. of 7-ACA from 7.19 g. of product B2 from Example 1, and 2.1 g. of 7-ACA from 6.3 g. of product B3 from Example 1.

EXAMPLE 10

The procedure of Example 8 was repeated using 7.5 g. of N-dichloroacetylcephalosporin C quinoline salt from Example 2 to yield 2.06 g. of 7-ACA.

EXAMPLE 11

To a stirred slurry of 4 g. of the 2-chloropropionyl derivative from Example 3 in 47 ml. of chloroform were added 5 ml. of quinoline and 3.4 ml. of dichlorodimethylsilane. The mixture was stirred at room temperature for 30 minutes then chilled to −22° C. To the chilled, stirred mixture was added 2.84 g. of phosphorous pentachloride and stirring was continued for two hours. To the mixture was added 16 ml. of n-propanol and stirring was continued for another two hours at −22° C. Two water extractions of 25 ml. and 16 ml. were made of the reaction mixture and the combined aqueous extracts were washed with an equal volume of chloroform. The pH of the aqueous phase was then adusted to 3.5 by the addition of a saturated solution of ammonium bicarbonate to precipitate 7-ACA. 7-ACA was recovered by filtration, washed with 16 ml. of cold 50 percent methanol and 15 ml. of cold acetone, then dried at 35° C. in a vacuum oven for three hours. The yield of 7-ACA was 1.02 g.

EXAMPLE 12

The various amine salts of N-chloroacetylcephalosporin C prepared in Example 4 were converted to 7-ACA by the procedure described in Examples 8 and 11. The results obtained are summarized in the following table which lists the amine, the number of millimoles of amine salt used as starting material, and the number of grams of 7-ACA obtained.

| Amine | Mmoles of salt | Grams of 7-ACA |
|---|---|---|
| Quinoline | 10 | 1.65 |
| 2-picoline | 10 | 1.24 |
| 3-picoline | 10 | 1.68 |
| 4-picoline | 7 | 0.45 |
| N-ethylmorpholine | 10 | 1.03 |
| N-methylmorpholine | 10 | 1.35 |
| 2,6-lutidine | 6.7 | 0.2 |

EXAMPLE 13

To a stirred slurry of 21.9 g. of the product from Example 5 in 220 ml. of alcohol-free chloroform were added 34.3 ml. of quinoline and 21.5 ml. of dichlorodimethylsilane. After stirring for 40 minutes the mixture was chilled to −15° C. and 13.5 g. of phosphorous pentachloride was added. Stirring was continued for two hours at −15° to −20° C. and 75 ml. of n-propanol was then added and the mixture stirred for another two hours at −15° to −20° C. The mixture was extracted with 98 ml. of distilled water and the pH of the aqueous extract was adjusted from 0.7 to 3.6 by the addition of 24 ml. of concentrated ammonium hydroxide in an ice bath. The mixture was allowed to stand in the refrigerator overnight, filtered and the filter cake washed with 20 ml. of 50 percent cold aqueous methanol followed by 40 ml. of cold acetone. The solid was dried at 40° C. in a vacuum oven overnight to yield 5.44 g. of 7-ACA.

EXAMPLE 14

The general procedure of Example 13 was repeated using 47.5 g. of the product from Example 6. The yield of 7-ACA was 13.02 g.

The following example illustrates the advantage of using an amine salt. Heretofore, the examples have used the 40-minute reaction period of the prior art in preparing the silyl ester from the amine salt. The following example demonstrates that a much shorter reaction period is adequate.

EXAMPLE 15

To a stirred slurry of 9.5 mmoles of the quinoline salt of N-chloroacetylcephalosporin C in 70 ml. of alcohol-free chloroform were added 8 ml. of quinoline and 5.4 ml. of dichlorodimethylsilane. The reaction mixture was stirred for five minutes, then chilled to −22° C. and 4.5 g. of phosphorous pentachloride was added. After stirring for two hours at −22° C. 25 ml. of n-propanol was added and stirring was continued for an additional two and three-quarter hours. Two water extractions of 40 and 25 ml. were made of the reaction mixture. The combined aqueous phase was washed with an equal volume of chloroform and then the pH was adjusted to 3.7 by the addition of a saturated solution of ammonium bicarbonate to precipitate the 7-ACA. The mixture was allowed to stand in a refrigerator overnight, filtered, the filter cake washed with 25 ml. of cold aqueous methanol followed by 25 ml. of cold acetone and dried in a vacuum oven at 35° C. to yield 1.98 g. of 7-ACA. This procedure was repeated using identical starting materials and identical conditions except that the mixture was stirred for 40 minutes after addition of the quinoline and dichlorodimethylsilane rather than the five minutes used in the previous run. The yield of 7-ACA from this reaction was 1.99 g. as compared to 1.98 g. from the shorter reaction time.

EXAMPLE 16

To a suspension of 5.14 g. of the sodium salt of N-chloroacetylcephalosporin C (prepared as described in Example 7) in 38 ml. of chloroform were added 8 ml. of quinoline and 3.6 ml. of dichlorodimethylsilane. The reaction mixture was stirred for 40 minutes, cooled to −22° C., and 4.5 g. of phosphorous pentachloride was added. This mixture was stirred for two and one-half hours at −22° C., chilled to −35° C., and 25 ml. of n-propanol was added. After stirring at −22° C. for two hours 40 ml. of water was added and the phases separated. A second extraction with 25 ml. of water was prepared and the combined aqueous extract was back extracted with chloroform. The pH of the aqueous phase was then adjusted to 4.0 by the addition of a saturated ammonium bicarbonate solution. The precipitated 7-ACA was recovered by filtration, washed with 25 ml. of 50 percent aqueous methanol and 25 ml. of acetone, and dried in a vaccum oven. The yield was 1.6 g.

A number of novel cephalosporin C derivatives are obtained as intermediates in our improved cleavage process. These novel intermediates are those having the following formulas

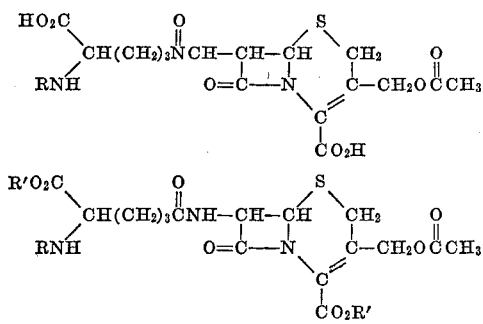

wherein:

R is an α-halo or α,α-dihalo $C_2$–$C_4$ alkanoyl group; and R' is $C_1$–$C_4$ alkyl, $C_4$–$C_8$ t-alkyl, $C_5$–$C_8$ t-alkenyl, $C_5$–$C_8$ t-alkynyl, phenacyl, trichloroethyl, benzyl, benzhydryl, p-methoxybenzyl, p-nitrobenzyl, trityl, trimethylsilyl, dimethylsilyl, methylsilyl, triethylsilyl, diethylsilyl, or ethylsilyl;

and the alkali metal, alkaline earth metal, quinoline, cyclohexylamine, 5-ethyl-2-methylpyridine, 2-picoline, 3-picoline, 4-picoline, N-ethylmorpholine, N-methylmorpholine, 2,6-lutidine, N,N-diethylcyclohexylamine, hexamethylenetetramine, N,N-dimethylbenzylamine, or N,N'-dibenzylethylenediamine salts of the acid.

Examples of suitable haloalkanoyl groups include chloroacetyl, dichloroacetyl, 2-chloropropionyl and 2-chlorobutyryl. R' serves as a carboxyl protecting group and is not particularly important. It is preferred to use a carboxyl protecting group which is easily removed at the completion of the reaction to generate the free 7-ACA. The protection of carboxyl groups is well known both generally and as applied to cephalosporin chemistry. In addition to those groups specifically named above other suitable carboxyl-protecting groups include methyl, t-butyl, 3-methyl-3-butenyl, and 3-methyl-3-butynyl. Those skilled in the art will recognize that there are other carboxyl-protecting groups equivalent to those we have named. Alkali metal and alkaline earth metal salts of the acid may be, for example, the sodium, potassium, calcium, or barium salt.

The preferred intermediates are those wherein R is chloroacetyl and R' is a silyl group and the quinoline salt of N-chloroacetylcephalosporin C.

We claim:

1. In a process for the preparation of 7-aminocephalosporanic acid from cephalosporin C by protecting the carboxyl groups, treating with a halogenating agent to convert the amido group in the 7-position to an imino halide, converting the imino halide to an imino ether, and hydrolyzing the imino ether to 7-aminocephalosporanic acid, the improvement which comprises acylating the amino group in the adipamyl side chain with an α-halo or α,α-dihalo $C_2$–$C_4$ alkanoyl group prior to the step of protecting the carboxyl groups.

2. A process as in claim 1 wherein the halo $C_2$–$C_4$ alkanoyl group is chloroacetyl.

3. A process as in claim 2 wherein the N-chloroacetylcephalosporin C is treated with quinoline, cyclohexylamine, 5-ethyl-2-methylpyridine, 2-picoline, 3-picoline, 4-picoline, N-ethylmorpholine, N-methylmorpholine, 2,6-lutidine, N,N-diethylcyclohexylamine, hexamethylenetetramine, N,N-dimethylbenzylamine or N,N'-dibenzylethylenediamine to form the amine salt prior to the step of protecting the carboxyl group.

4. A process as in claim 3 wherein the quinoline salt of N-chloroacetylcephalosporin C is formed prior to the step of protecting the carboxyl group.

5. A process as in claim 4 wherein the halogenating agent is phosphorous pentachloride, the imino ether is the n-propyl ether and the carboxyl groups are protected by formation of the methylsilyl ester.

6. An N-acylated cephalosporin C having the formula

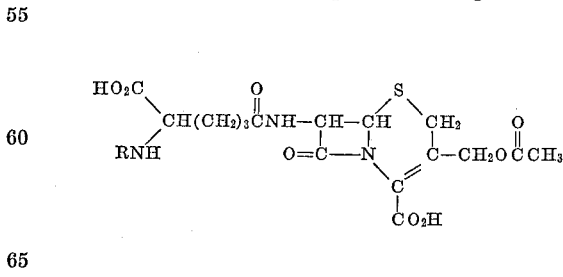

wherein R is an α-halo or α,α-dihalo $C_2$–$C_4$ alkanoyl group, and the alkali metal, alkaline earth metal, quinoline, cyclohexylamine, 5-ethyl-2-methylpyridine, 2-picoline, 3-picoline, 4-picoline, N-ethylmorpholine, N-methylmorpholine, 2,6-lutidine, N,N-diethylcyclohexylamine, hexamethylenetetramine, N,N-dimethylbenzylamine, or N,N'-dibenzylethylenediamine salts thereof.

7. A quinoline salt as in claim 6 wherein R is chloroacetyl.

8. A compound having the formula

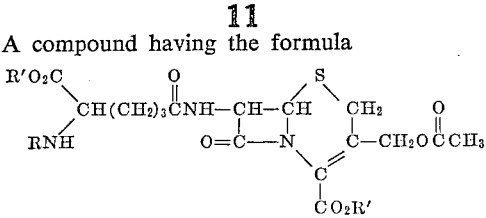

wherein:

R is an α-halo or α,α-dihalo $C_2$–$C_4$ alkanoyl group; and
R' is $C_1$–$C_4$ alkyl, $C_4$–$C_8$ t-alkyl, $C_5$–$C_8$ t-alkenyl, $C_5$–$C_8$ t-alkynyl, phenacyl, trichloromethyl, benzyl, benzhydryl, p-methoxybenzyl, p-nitrobenzyl, trityl, trimethylsilyl, dimethylsilyl, methylsilyl, triethylsilyl, diethylsilyl, or ethylsilyl.

9. A compound as in claim 8 wherein R is chloroacetyl and R' is dimethylsilyl.

10. A compound as in claim 8 wherein R is chloroacetyl and R' is ethylsilyl.

References Cited
UNITED STATES PATENTS
3,499,909   3/1970   Weissenburger et al. _ 260—239.1
FOREIGN PATENTS
1,041,985   9/1966   Great Britain. _____ 260—243

NICHOLAS S. RIZZO, Primary Examiner